United States Patent [19]
Beebe et al.

[11] Patent Number: 6,101,610
[45] Date of Patent: Aug. 8, 2000

[54] COMPUTER SYSTEM HAVING THERMAL SENSING WITH DUAL VOLTAGE SOURCES FOR SENSOR STABILIZATION

[75] Inventors: William Eldred Beebe, Round Rock; John Daniel Upton, Georgetown, both of Tex.

[73] Assignee: International Business Machines Corporation, Armonk, N.Y.

[21] Appl. No.: 08/829,560

[22] Filed: Mar. 28, 1997

[51] Int. Cl.[7] .................................................... G06F 1/26
[52] U.S. Cl. .......................... 713/323; 713/324; 714/24
[58] Field of Search .......................... 395/182.12, 182.2, 395/750.01, 750.03, 750.05; 307/64, 86; 361/86; 364/140.04, 140.05; 713/300, 320, 323, 324, 340; 714/14, 22, 24

[56] References Cited

U.S. PATENT DOCUMENTS

| | | | |
|---|---|---|---|
| 4,497,021 | 1/1985 | Fukuda et al. | 364/200 |
| 4,857,756 | 8/1989 | Haneda | 307/66 |
| 5,032,971 | 7/1991 | Yamada | 363/65 |
| 5,410,712 | 4/1995 | Okuno | 395/750.01 |
| 5,483,464 | 1/1996 | Song | 364/492 |
| 5,513,361 | 4/1996 | Young | 395/750.01 |
| 5,588,054 | 12/1996 | Shin et al. | 379/413 |
| 5,703,790 | 12/1997 | Farwell | 364/492 |
| 5,714,873 | 2/1998 | Hwang | 323/273 |
| 5,745,375 | 4/1998 | Reinhardt et al. | 713/322 |
| 5,758,171 | 5/1998 | Ramamurthy et al. | 713/300 |
| 5,974,557 | 10/1999 | Thomas et al. | 713/322 |

Primary Examiner—Glenn A. Auve
Attorney, Agent, or Firm—Volel Emile; Felsman, Bradley, Vaden, Gunter & Dillon, LLP

[57] ABSTRACT

A computer system employs a thermal sensor in the main CPU housing to detect operating temperature. If a preselected trip point is reached indicating that overheating may be about to occur, the system goes into an orderly shutdown mode. A standby mode uses a low-power service processor which continues to operate even when the main unit is shut down. The service processor has limited functions, including detecting temperature within the main housing, and communicating by a network with a system administrator unit and reporting on the temperature in the main housing, and on the operating status of the main unit. A mechanism is provided to prevent the main processor unit from being unnecessarily shut down when the operating temperature is near but not beyond the trip point, as may occur due to variations in the power supply voltage and the voltage-dependence of the thermal sensor. This mechanism employs voltage stabilization of the supply for the thermal sensor when the computer is in its standard operating mode and the power supply for the main processor unit is running. Here the sensor is supplied from a precision voltage reference of a high degree of accuracy. However, when entering the standby mode, the main power supply is shut down, and so the thermal sensor is then operating from an auxiliary voltage source that is not stabilized. A simple isolating circuit allows one sensor to be used in both operating conditions, using one or the other of the power supplies. Since the trip point is much less important in the standby mode, there is no problem caused by the lack of precision in the voltage source.

11 Claims, 2 Drawing Sheets

COMPUTER SYSTEM HAVING THERMAL SENSING WITH DUAL VOLTAGE SOURCES FOR SENSOR STABILIZATION

BACKGROUND OF THE INVENTION

This invention relates to a computer system having a thermal sensor to detect overheating and to allow system shutdown before unstable operating conditions occur, and more particularly to such a system wherein a dual voltage source is used to provide stabilization of a thermal sensor.

Computer systems use thermal sensors mounted in the CPU housing to determine when the system is operating outside its specified range. Usually these thermal sensors have a circuit which establishes a trip point at which an interrupt is signalled to the operating system of the CPU to take appropriate action, e.g., to begin an orderly shutdown of the system when a certain temperature is reached. In this manner, all files can be closed, data written to permanent storage (hard disk), and any pending tasks or applications properly closed. A lower set point may merely generate a message to a system administrator to indicate that overheating is approaching so that action can be taken. In any event, the set points or trip points must be closely controlled so that unnecessary overheating conditions are not signalled.

Commercially-available, relatively inexpensive, thermal sensors are characterized in that the outputs vary in response to supply voltage (or current) as well as with temperature. The result of this voltage sensitivity is that the thermal sensor circuitry can report overheating when the actual temperature is within tolerable limits. This causes unnecessary shutdown of the system, and as a consequence the maintenance cost and system downtime are needlessly affected.

In one example, a computer system may specify the power supply as producing operating voltages for the computer that are at nominal levels such as 5V or 12V, but these may vary +/-5% and still be within operating tolerance. But if the temperature inside the CPU housing is specified to be a maximum of 70° C., and if the thermal sensor which is used has an output that varies with voltage supply level, then the overheating shutdown may be tripped at 66.5° C. This is unnecessary and wasteful, since the computer system may be able to operate continuously at a high performance level at this temperature, with no unwanted effects.

SUMMARY OF THE INVENTION

It is therefore one object of the present invention to provide an improved thermal sensing method for a computer system or the like.

It is another object of the present invention to provide improved stabilization of a thermal sensor used in a computer system.

It is a further object of the present invention to provide an improved method of stabilizing the trip points of a shutdown mechanism responsive to overheating in a computer system or the like.

An additional object is to provide an improved mechanism for responding to overheating in a computer system or the like, particularly a mechanism which has varying levels of precision depending upon the mode of operation.

The above as well as additional objects, features, and advantages of the present invention will become apparent in the following detailed written description.

According to one embodiment of the invention, a computer system has a thermal sensor mounted in the main CPU housing to detect the operating temperature, so that if a preselected trip point is reached which indicates that overheating may be about to occur, the system can go into an orderly shutdown mode. An orderly shutdown is most preferable to avoid loss of data and to facilitate restart. The system has a standby mode wherein an auxiliary or service processor continues to operate even when the main processing unit has been shut down. The service processor consumes much less power, compared to the main processor, and has limited functions which include the ability to detect the temperature within the main housing, and to send messages to and receive messages from a system administrator unit which would usually be located away from this system housing. These messages include the temperature in the housing, the operating status of the main processor unit, etc. A mechanism is provided to prevent the main processor unit from being unnecessarily shut down when the operating temperature is near but not beyond the trip point, as may occur due to variations in the power supply voltage and the voltage-dependence of the thermal sensor. The mechanism employs voltage stabilization of the supply for the thermal sensor when the standard operating mode and the power supply for the main processor unit is running. Here the sensor is supplied from a precision voltage reference of a high degree of accuracy. However, when entering the standby mode, the main power supply must be shut down so as to allow the system to cool, and so the thermal sensor is then operating from an auxiliary voltage source that is not stabilized. A simple isolating circuit allows one sensor to be used in both operating conditions, using one or the other of the power supplies. Since the criticality of the trip point is much less important in the standby mode, there is no problem in the lack of precision in the voltage source. A mechanism for responding to overheating in the computer is thus provided which has two different levels of precision depending upon the mode of operation.

BRIEF DESCRIPTION OF THE DRAWINGS

The novel features believed characteristic of the invention are set forth in the appended claims. The invention itself however, as well as further objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
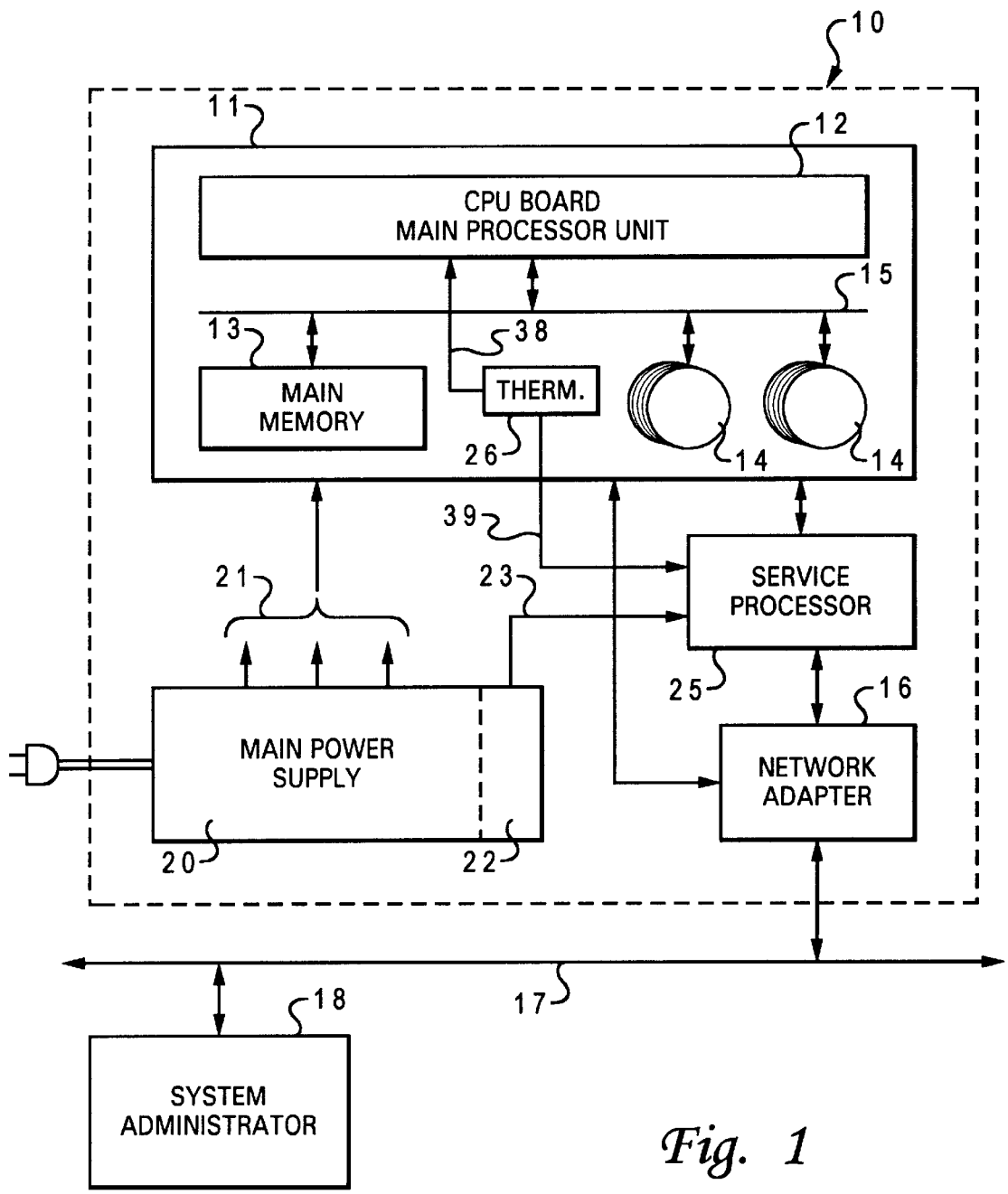
FIG. 1 is an electrical diagram in block form of a computer system constructed using features of one embodiment of the present invention.

Referring to FIG. 1, a computer system 10 is shown which may employ a thermal sensor with the dual voltage source thermal sensor stabilization arrangement of the invention. This system 10 has a main processor unit which contains a CPU board 12, a main memory 13, and a number of hard disk units 14, as well as other I/O equipment such as CD-ROM drives, tape drives, etc., connected by a system bus 15. The CPU board 12 may contain a number of processors. Typically, this is a high level, high performance unit that is used as a server or the like, rather than as a standalone desktop or personal computer. The processor unit 11 is connected by a network adapter 16 to a communication path 17 for coupling to other resources on the network. A system administrator unit 18 is on the network to monitor and control the resources, including the unit 11.

A main power supply 20 is usually located within the housing of the system 10 to supply operating voltages to the processor unit 11 including its multiple microprocessor chips and the I/O equipment. This is a regulated supply usually having outputs 21 of 5V, 12V, 24V, etc. An auxiliary power supply 22 is included, producing only a 5V output 23 at a low current level.

A service processor 25 is included in the system 10 and is operative only for a limited number of functions, including monitoring the temperature in the housing of system 10 and the operating condition (e.g., standby mode, fully operational, etc.) of the main processor board 12. This service processor 25 is capable of sending messages to and receiving messages from the system administrator 18 via the network adapter 16 in the system 10 and the network path 17. An important feature is that the service processor 25 is operated from a different power supply output, particularly it receives power from the output 23 of the power supply. In a typical scenario, the main processor board 12 may be placed in standby mode due to overheating (in response to the thermal sensing to be described), and the service processor 25 monitors the status and temperature of the main processor 12 and reports it to the system administrator 18 during this standby mode. At some point, after the main processor has cooled, the system administrator may signal the service processor to restart the main processor (perhaps at a lower performance level, shutting off some resources) to see if the system will now operate in an acceptable temperature range.

According to the invention, a thermal sensing unit 26 is located in the main processor unit 11, preferably near the CPU board 12 since this is the most temperature-sensitive part of the system. The thermal sensing unit 26 is shown in more detail in FIG. 2. A thermistor 27 is mounted in a position to be responsive to temperature in the housing of the computer system, and functions to change resistance linearly with temperature, so a voltage level at a node 28 in series with the thermistor and a constant current element 29 will provide an input to an opamp 30. The other input to the opamp is a voltage level derived from a voltage supply line 31, via a pair of resistors 32. Feedback from the output of the opamp is also supplied via a resistor 33 to this input node 34. The assembly of the opamp, the constant current source, the thermistor 27, and the biasing resistors 32 is a commercially-available unit sold by Analog Devices, Inc. as part number AD22100. The output 35 of the opamp 30 is applied to an A-to-D converter 36, which produces a digital output used by logic 37 to generate an interrupt on line 38 going to the CPU board 12, an also generating a value sent to the auxiliary processor 25 via line 39.

Figure 2:
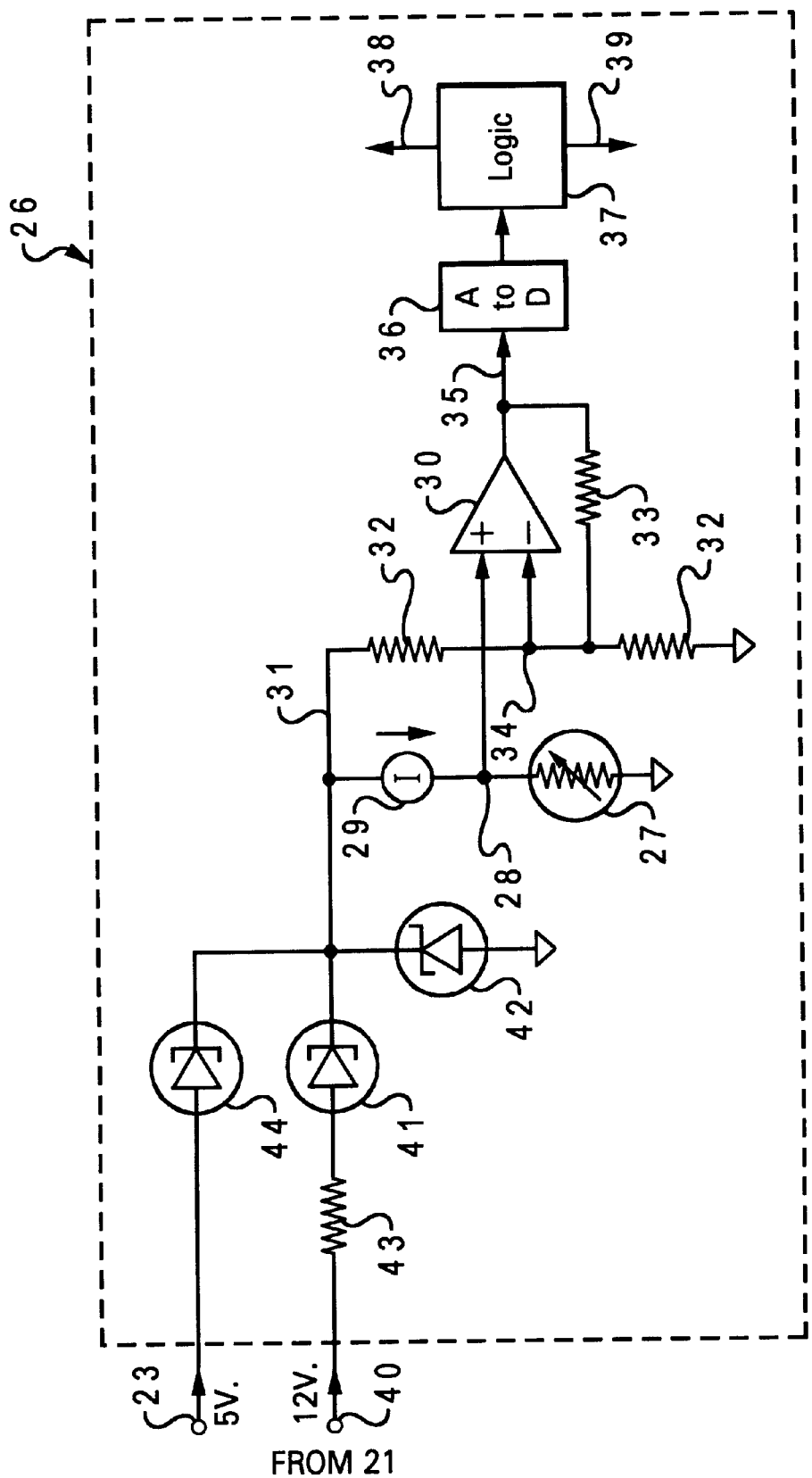
FIG. 2 is an electrical schematic diagram of a thermal sensor circuit used in the system of FIG. 1 according to an embodiment of the invention.

The voltage level at node 28 which causes an interrupt to be signalled to the CPU via output line 38 by the circuit of FIG. 2 is dependent, unfortunately, on the voltage level on the supply line 31. The resistance of the thermistor 27 is quite precisely linear with temperature, but the voltage level at node 34 is of course responsive to the voltage on line 31.

An important feature of the invention is the use of dual voltage sources and a stabilization circuit for the thermal sensor of FIG. 2. During normal operation, a voltage input 40 is obtained from one of the outputs 21 of the main power supply 20, in this case a 12V level. This is a regulated voltage, but still it may vary +/−5%, perhaps, and still be within specifications. Accordingly, a voltage blocking device 41 is placed in series with the supply line, and a zener diode reference device 42 is placed across the thermistor circuit; this combination, along with resistor 43, maintains a voltage on line 31 that is stabilized at 5V within +/−0.1% Thus, the trip point for sending an interrupt to the CPU for overheating condition is at precisely the desired level, rather than being dependent upon the power supply output voltage level. The reference device 42 may be of the type available from National Semiconductor Corp. as part number LM4040, and the voltage blocking device 41 is of the type available from Philips Semiconductors as BAT54 series Schottky barrier diodes. Since the 12V output from the main power supply will go off when the system goes to the standby mode, a separate 5V supply is obtained from line 23 from the auxiliary power supply 22, to provide a voltage to the line 31 during standby; this separate path uses a voltage blocking device 44 which may be part of a dual BAT54 Schottky diode device. Schottky devices are used as these have a low forward drop; the function of the two blocking devices 41 and 44 is to isolate the line 31 from the power supply outputs for reverse currents. Thus, a temperature reading is still obtained to send information to the service processor 25 via line 39, but this need not be at such a precise trip level.

While the invention has been particularly shown and described with reference to a preferred embodiment, it will be understood by those skilled in the art that various changes in form and detail may be made therein without departing from the spirit and scope of the invention.

What is claimed is:

1. An electronic system comprising:

a first processing unit having a first power supply;

a sensing unit responsive to a condition in said first processing unit and operative to generate a signal if said condition reaches a selected level; said sensing unit including a voltage stabilizing device;

said first processing unit responsive to said signal to switch from an operating mode to a standby mode and to shut off said first power supply;

a second processing unit having an auxiliary power supply;

said second processing unit being responsive to values in said first processing unit including said sensing unit, and being coupled to communicate information in response to said values;

said sensing unit being supplied from said first power supply via a first blocking device when in said operating mode and being supplied from said auxiliary power supply via a second blocking device when in said standby mode.

2. A system according to claim 1 wherein said condition is temperature and said sensing unit is thermally responsive.

3. A system according to claim 1 wherein said second processing unit is connected to a communication path to send messages to and receive messages from a system administrator unit about said values.

4. A system according to claim 1 wherein said sensing unit includes:

a thermally-responsive device;

a detector connected to said thermally-responsive device to generate a signal when the thermally-responsive device indicates a selected condition;

said first voltage supply being connected to said thermally-responsive device via said first blocking device when said system is said operating mode;

said auxiliary voltage supply being connected to said thermally-responsive device via said second blocking device when said system is in said standby mode;

said voltage stabilizing device being a constant-voltage reference connected across said thermally-responsive device.

5. A system according to claim 4 wherein said detector includes an opamp and an analog-to-digital converter; and wherein said signal is by an interrupt to said processing unit.

6. A computer system comprising:

a main processing unit;

a main power supply for said main processing unit;

a thermal sensing unit responsive to temperature in said main processing unit and operative to generate a signal if said temperature reaches a selected level;

said main processing unit responsive to said signal to switch from an operating mode to a standby mode by an orderly shutdown of said main processing unit and to shut off said main power supply;

an auxiliary processing unit;

an auxiliary power supply for said auxiliary processing unit;

said auxiliary processing unit being responsive to conditions in said main processing unit including said thermal sensing unit, and being connected to a communication path to send messages to and receive messages from a system administrator unit about said conditions;

said thermal sensing unit being supplied from said main power supply via a first isolating device when in said operating mode and being supplied from said auxiliary power supply via a second isolating device when in said standby mode.

7. A computer system according to claim 6 wherein said thermal sensing unit includes:

a thermally-responsive device;

a detector connected to said thermally-responsive device to generate a signal when the device indicates a selected condition;

said first voltage supply connected to said device via a first blocking diode when said system is said operating mode;

said second voltage supply connected to said thermally-responsive device via a second blocking diode when said system is in said standby mode;

a constant-voltage reference connected across said device.

8. A computer system according to claim 7 wherein said detector includes an opamp and an analog-to-digital converter; and wherein said signal is by an interrupt to said processing unit.

9. A method of operating a computer system of the type having a main processing unit with a main power supply and an auxiliary processing unit with an auxiliary power supply; comprising the steps of:

sensing temperature in said main processing unit and generating a signal if said temperature reaches a selected level;

switching said main processing unit, responsive to said signal, from an operating mode to a standby mode by an orderly shutdown of said main processing unit and shutting off said main power supply;

detecting conditions in said main processing unit by said auxiliary processing unit, and said auxiliary processing unit sending messages to and receiving messages from a system administrator unit about said conditions;

and stabilizing said sensing of temperature via a first voltage stabilizer supplied from said main power supply when in said operating mode and via a second voltage stabilizer supplied from said auxiliary power supply when in said standby mode.

10. A method according to claim 9 wherein said first voltage stabilizer includes clamping the voltage across a thermally-responsive device and applying a voltage thereto via a first isolating device.

11. A method according to claim 10 wherein said second voltage stabilizer includes clamping the voltage across said thermally-responsive device and applying a voltage thereto via a second isolating device.

* * * * *